United States Patent Office 2,698,339
Patented Dec. 28, 1954

2,698,339

MANUFACTURE OF PIMELIC ACID AND INTERMEDIATES THEREFOR

Edwin George Edward Hawkins, Tadworth, England, and Edward Severin Stern, Edinburgh, Scotland, assignors to The Distillers Company Limited, Edinburgh, Scotland, a British company No Drawing. Application December 17, 1951,
Serial No. 262,177

Claims priority, application Great Britain
December 23, 1950

7 Claims. (Cl. 260—468)

The present invention relates to an improved process for the manufacture of pimelic acid from delta$^3$-tetrahydrobenzaldehyde and to the preparation of a new compound as an intermediate in the manufacture of pimelic acid.

Tischtschenko et al. in Chem. Zentral., 1906, volume 2, pages 1309, 1554 and 1556, show that saturated aliphatic and aromatic aldehydes can be condensed smoothly with aluminium or magnesium alkoxides to form simple esters. Aluminium alkoxides are the more efficient catalysts. This reaction, however, does not appear to be of general application to unsaturated aldehydes as several authors have reported their failure to condense acrolein and crotonaldehyde in this way—see for example Tischtschenko loc. cit.; Zappi and Labriola, Anales Asoc. Quim., Argentina, 1934, volume 22, pages 133 to 142. It has now been found that delta$^3$-tetrahydrobenzaldehyde condenses readily and in substantially quantitative yield in the presence of aluminium alkoxides to give detal$^3$-tetrahydrobenzyl delta$^3$-tetrahydrobenzoate. It has also been found that pimelic acid may be prepared with improved yields from delta$^3$-tetrahydrobenzaldehyde by using delta$^3$-tetrahydrobenzyl delta$^3$-tetrahydrobenzoate as an intermediate in its preparation.

According to the present invention the process for the preparation of pimelic acid comprises condensing delta$^3$-tetrahydrobenzaldehyde in the presence of an aluminium or magnesium alkoxide to give delta$^3$-tetrahydrobenzyl delta$^3$-tetrahydrobenzoate, hydrolysing said delta$^3$-tetrahydrobenzyl delta$^3$-tetrahydrobenzoate to give delta$^3$-tetrahydrobenzoic acid or a salt thereof and delta$^3$-tetrahydrobenzyl alcohol, and heating the delta$^3$-tetrahydrobenzoic acid or salt thereof in the presence of alkali to a temperature in the range 250°–400° C. to give the corresponding salt of pimelic acid. According to one modification of the invention the hydrolysis products of the delta$^3$-tetrahydrobenzyl delta$^3$-tetrahydrobenzoate are separated, the salt of delta$^3$-tetrahydrobenzoic acid being heat treated as above, and the separated delta$^3$-tetrahydrobenzyl alcohol converted to delta$^3$-tetrahydrobenzaldehyde which is returned to the first stage of the process.

The present invention also includes the preparation of delta$^3$-tetrahydrobenzyl delta$^3$-tetrahydrobenzoate by the condensation of delta$^3$-tetrahydrobenzaldehyde in the presence of an aluminium or magnesium alkoxide to give delta$^3$-tetrahydrobenzyl delta$^3$-tetrahydrobenzoate.

The condensation of delta$^3$-tetrahydrobenzaldehyde may be carried out at temperatures between about 0° C. to 110° C., although higher or lower temperatures may be used. The temperature limits 0° C. to 110° C. represent the approximate limits within which the economical working of the process may be effected. In general the condensation of the delta$^3$-tetrahydrobenzaldehyde proceeds more satisfactorily and in better yields at lower temperatures, for example at temperatures below 65° C. and suitably in the range 20° to 40° C. Where the condensation is carried out continuously it may be found more convenient to carry out the reaction at higher temperatures and temperatures of, for example 70–80° C., have been found satisfactory.

The presence of acidic impurities in the delta$^3$-tetrahydrobenzaldehyde starting material has been found to have a deleterious effect on the reaction, and if the delta$^3$-tetrahydrobenzaldehyde contains acidic impurities in amount of the order of 0.5–3% or more difficulty may be found in taking the conversion to completion. Such acidic impurities are formed in the delta$^3$-tetrahydrobenzaldehyde when it is allowed to stand or is stored for any length of time, and it is, therefore, preferred to employ freshly distilled delta$^3$-tetrahydrobenzaldehyde for the condensation reaction. If it is desired to employ a delta$^3$-tetrahydrobenzaldehyde starting material containing acidic impurities, it will be found that the use of the lower reaction temperatures, for example of less than 65° C., is beneficial. It is believed that the acidic impurities in some way react or inactivate the alkoxide catalyst, and it has been found that the use of increased or additional amounts of the catalyst will counteract the effect of these impurities. Thus, although it is naturally preferable to employ a delta$^3$-tetrahydrobenzaldehyde starting material substantially free of acidic impurities, the effect of the presence of such impurities may be mitigated by the use of lower reaction temperatures and increased amounts of catalyst.

The reaction may be carried out in the presence or absence of inert organic solvents, such as esters, ethers and hydrocarbons, but the reaction will not usually proceed satisfactorily in the presence of alcohols and particularly the lower boiling alcohols. However, it has been found that the reaction will proceed satisfactorily in the presence of delta$^3$-tetrahydrobenzyl alcohol in amount up to about 25% by weight of the total reaction mixture. It is preferred to use delta$^3$-tetrahydrobenzyl delta$^3$-tetrahydrobenzoate as the reaction medium. As catalyst for the condensation any aluminium or magnesium alkoxide may be used, and suitable catalysts include aluminium ethoxide, aluminium isopropoxide, aluminium isobutoxide, magnesium ethoxide, magnesium isopropoxide and magnesium isobutoxide. The catalyst concentration, based on the delta$^3$-tetrahydrobenzaldehyde is preferably between 1% and 5% by weight. Catalyst concentrations in excess of 5% may be used if desired, and may be necessary if the delta$^3$-tetrahydrobenzaldehyde starting material contains acidic impurities. It is preferred to use an aluminium alkoxide catalyst, and this is most suitably aluminium isopropoxide.

The condensation reaction may be carried out until the aldehyde is substantially completely condensed or the condensation may be stopped before this stage is reached. In the latter case the unreacted aldehyde may be removed from the condensation product, for example by distillation suitably after neutralisation of the metal alkoxide catalyst, before the product is further treated for the production of pimelic acid. Alternatively, however, as delta$^3$-tetrahydrobenzaldehyde undergoes partial conversion to pimelic acid by heat treatment in the presence of alkali, the incompletely reacted condensation product may be hydrolysed and then subjected to the heat treatment in the presence of alkali, most suitably after removal of the produced delta$^3$-tetrahydrobenzyl alcohol, for the production of pimelic acid.

It is to be understood that where it is desired merely to produce delta$^3$-tetrahydrobenzyl delta$^3$-tetrahydrobenzoate, the process is complete after the condensation of the delta$^3$-tetrahydrobenzaldehyde in the presence of the metal alkoxide. The ester may be isolated from the product in any suitable way and subjected to such purification processes, for example distillation, as are desired. Delta$^3$-tetrahydrobenzyl delta$^3$-tetrahydrobenzoate has a boiling point of 152°–153° C. at 7.0 mm. of mercury pressure, and refractive index $n_D^{20}$ 1.4963.

In the production of pimelic acid, the delta$^3$-tetrahydrobenzyl delta$^3$-tetrahydrobenzoate, with or without separation from the total condensation product, may be hydrolysed, producing delta$^3$-tetrahydrobenzoic acid or a salt thereof and delta$^3$-tetrahydrobenzyl alcohol. The hydrolysis of the delta$^3$-tetrahyrobenzyl delta$^3$-tetrahydrobenzoate may be effected according to any of the methods used or described in the art for the hydrolysis of esters. It is preferred, however, to effect the hydrolysis of the delta$^3$-tetrahyrobenzoate in the presence of alkali, particularly as the hydrolysis products are to be further treated in the presence of alkali. Where the hydrolysis is so carried out in the presence of alkali the hydrolysis products will comprise delta³-tetrahydrobenzyl alcohol and the salt of delta³-tetrahydrobenzoic acid corresponding to the alkali employed.

The delta³-tetrahydrobenzoic acid or salt thereof, without separation, or after partial or complete separation from the hydrolysis product, is then pyrolysed in the presence of alkali to give pimelic acid. The pyrolysis is carried out at temperatures in the range 250°–400° C., and preferably in the range 300–375° C., for example 325°–350° C., and may be effected batchwise, for example in an autoclave, or continuously, for example in a coil reactor. The amount of alkali employed requires to be at least equivalent to the theoretical amount, that is the amount necessary for salt formation, and suitably a slight excess over this theoretical amount is used. If less than the theoretical amount is employed the reaction cannot proceed to completion. Very suitably sufficient alkali may be added to the ester in one stage for both the hydrolysis and the conversion to pimelic acid. Thus, a convenient method of effecting the conversion of delta³-tetrahydrobenzyl delta³-tetrahydrobenzoate to pimelic acid is to add at least two moles of alkali to one mole of the ester, reflux the ester to effect the hydrolysis thereof, and thereafter subjecting the hydrolysis product to the action of heat, suitably after the removal therefrom of the delta³-tetrahydrobenzyl alcohol, for example by steam distillation, extraction, for example with an immiscible solvent such as ether, or decantation.

The alkali employed in the process of the present invention is suitably an alkali metal hydroxide, and preferably sodium hydroxide or potassium hydroxide.

According to a special feature of the present invention, delta³-tetrahydrobenzyl alcohol is converted, for example by oxidation or dehydrogenation to give delta³-tetrahydrobenzaldehyde. Oxidation of the delta³-tetrahydrobenzyl alcohol may be carried out in the vapour phase, at temperatures between 350° C. and 500° C., in the presence of an oxidation catalyst such as silver. Although the oxidation may be carried out to substantial completion, it has been found preferable to effect only partial oxidation of the alcohol. Dehydrogenation of delta³-tetrahydrobenzyl alcohol may be effected in the presence of a copper chromite type of catalyst as described by Adkins et al. (Journal of American Chemical Society, 1933, volume 55, page 2992). The delta³-tetrahydrobenzaldehyde, however obtained, may be reused in the first stage of the process for the preparation of pimelic acid. As it has been found that the condensation of delta³-tetrahydrobenzaldehyde proceeds smoothly in the presence of delta³-tetrahydrobenzyl alcohol in amounts up to about 25% by weight of the total reaction mixture, the oxidation or dehydrogenation product, without stripping off or only partly stripping off the delta³-tetrahydrobenzyl alcohol, may be returned to this first stage of the process after making up with fresh aldehyde. It is, however, essential for the economical use of the catalyst to ensure that the reaction mixture used for the condensation is substantially anhydrous.

The process of the present invention is described more fully by way of illustration in the following examples. The parts and percentages referred to are by weight.

*Example 1*

12.5 parts of aluminium isopropoxide are dissolved in 50 parts of delta³-tetrahydrobenzyl delta³-tetrahydrobenzoate and 500 parts of freshly distilled delta³-tetrahydrobenzaldehyde are added with stirring to the solution, the reaction temperature being kept at 20–25° C. by cooling. After about one hour the reaction is stopped, only approximately 2% of the aldehyde remaining unreacted. The crude ester obtained is saponified by adding it to 615 parts of boiling 30% aqueous caustic soda solution and the product is steam distilled to remove the formed delta³-tetrahydrobenzyl alcohol in the distillate.

Aqueous caustic soda solution is added to the sodium delta³-tetrahydrobenzoate solution forming the residue of the distillation, in amount such that the final molecular ratio of caustic soda to sodium delta³-tetrahydrobenzoate in the solution is 2:1, and the resulting solution is heated to 300° C. for 3 hours in an autoclave. The product is acidified and extracted with ether, the ether extract being distilled giving pimelic acid in an 82.5% yield based on the sodium delta³-tetrahydrobenzoate.

Delta³-tetrahydrobenzyl alcohol is separated from the distillate obtained in the steam distillation above, and is vaporised and passed with air over a silver gauze catalyst at 400° C., giving a product containing about 60% of delta³-tetrahydrobenzaldehyde. The product is azeotropically distilled with benzene to give a dry residue consisting of delta³-tetrahydrobenzaldehyde and delta³-tetrahydrobenzyl alcohol, and to this residue are added 260 parts of delta³-tetrahydrobenzaldehyde and the resulting mixture is subjected to a condensation reaction in the presence of aluminium isopropoxide as described above.

The process of this example may be repeated, with essentially similar results, replacing the sodium hydroxide employed by the equivalent amount of potassium hydroxide.

*Example 2*

8684 parts of freshly distilled delta³-tetrahydrobenzaldehyde is condensed with 113 parts of powdered aluminium isopropoxide, the temperature being maintained below 40° C. The crude delta³-tetrahydrobenzyl-delta³-tetrahydrobenzoate obtained is saponified by treatment with 10600 parts of boiling 30% aqueous sodium hydroxide, and the product is steam distilled to remove the formed delta³-tetrahydrobenzyl alcohol in the distillate.

The solution forming the residue of the distillation comprising sodium delta³-tetrahydrobenzoate and sodium hydroxide is heated in a rocking autoclave for 3 hours, the autoclave being maintained at a temperature of 340°–350° C. The product obtained is acidified and extracted with ether, the ether extract being distilled giving pimelic acid in an 82% yield.

The separated delta³-tetrahydrobenzyl alcohol is passed slowly through a reactor maintained at a temperature of 292–294° C. filled with a pelletted copper chromite catalyst containing a small amount of barium prepared exactly as described by Adkins et al. (Journal of American Chemical Society, 1933, volume 55, page 2992), the contact time (that is the time required for the passage of unit volume of feed (as liquid) through unit volume of catalyst) being of the order of 6 hours. The conversion of delta³-tetrahydrobenzyl alcohol to delta³-tetrahydrobenzaldehyde was 40%.

The process of this example may be repeated, with essentially similar results, replacing the sodium hydroxide employed with an equivalent amount of potassium hydroxide.

*Example 3*

Freshly distilled delta³-tetrahydrobenzaldehyde is condensed in the presence of 1.3% of aluminium isopropoxide as described in Example 2. The crude delta³-tetrahydrobenzyl-delta³-tetrahydrobenzoate obtained is saponified by treatment with a boiling 30% aqueous solution of sodium hydroxide containing 2 molar equivalents of sodium hydroxide and the product obtained is extracted with ether to remove the formed delta³-tetrahydrobenzyl alcohol. The residue obtained comprising sodium delta³-tetrahydrobenzoate and sodium hydroxide is passed through a coil reactor maintained at 340°–350° C., the rate of flow being equivalent to a 3 hour contact time based on cold volumes of feed and reactor. The pyrolysed product is acidified, extracted with ether and the ether extract distilled giving pimelic acid in a yield of 92.6% over the pyrolysis stage of the process.

The process of this example may be repeated, with essentially similar results, replacing the sodium hydroxide employed by an equivalent amount of potassium hydroxide.

The following examples illustrate various methods for the manufacture of delta³-tetrahydrobenzyl-delta³-tetrahydrobenzoate.

*Example 4*

2.5 parts of aluminium isopropoxide are dissolved in 10 parts of delta³-tetrahydrobenzyl delta³-tetrahydrobenzoate and 100 parts of freshly distilled delta³-tetrahydrobenzaldehyde are added with stirring to the solution, the reaction temperature being kept at 20–25° C. by cooling. After about one hour the reaction is stopped, only approximately 2% of the aldehyde remaining unreacted. The catalyst is decomposed by addition of aqueous acid and the product is extracted with ether. Distillation of the ether extract yields 101.3 parts of a high-boiling fraction, consisting almost entirely of delta³-tetrahydrobenzyl delta³-tetrahydrobenzoate.

Example 5

The process of Example 4 is repeated exactly as described above, with the exception that the delta³-tetrahydrobenzaldehyde employed is not freshly distilled, and contains some moisture, giving a product which, without decomposition of the catalyst, is directly distilled, giving 93.5 parts of a high-boiling fraction consisting almost entirely of delta³-tetrahydrobenzyl delta³-tetrahydrobenzoate.

Example 6

10 parts of aluminium isopropoxide are powdered and suspended in a little delta³-tetrahydrobenzaldehyde. A further 100 parts of the aldehyde are added gradually so that the reaction temperature maintains itself at 80–95° C. After the addition is complete the product is worked up as in Example 4, giving 72 parts of a high-boiling fraction consisting almost entirely of delta³-tetrahydrobenzyl delta³-tetrahydrobenzoate.

Example 7

10 parts of aluminium isopropoxide are powdered and added to 100 parts of delta³-tetrahydrobenzaldehyde. The reaction temperature is not controlled and the heat of reaction leads to the refluxing of the aldehyde. At the conclusion of the reaction the mixture is allowed to cool and is worked up as in Example 4 to give 77 parts (or a high-boiling fraction consisting essentially) of delta³-tetrahydrobenzyl delta³-tetrahydrobenzoate.

Example 8

5 parts of aluminium isopropoxide are dissolved in 10 parts of delta³-tetrahydrobenzyl delta³-tetrahydrobenzoate and a mixture of 129.6 parts of delta³-tetrahydrobenzaldehyde and 43.2 parts of delta³-tetrahydrobenzyl alcohol is added thereto with stirring. The reaction temperature is maintained below 30° C. with cooling. After standing for three hours the reaction product is worked up as in Example 4, to yield 118 parts of delta³-tertahydrobenzyl delta³-tetrahydrobenzoate.

Example 9

220 parts of delta³-tetrahydrobenzyl delta³-tetrahydrobenzoate, prepared as described in any of the preceding examples, and 200 parts of aqueous caustic soda (containing 80 parts of caustic soda) are heated to reflux with stirring for one hour. The product is extracted with ether and the ether extract is distilled, giving 93 parts of delta³-tetrahydrobenzyl alcohol and 6.5 parts of unchanged ester. The aqueous layer from the first extraction above is acidified, then extracted with ether and the ether extract distilled giving 117 parts of delta³-tetrahydrobenzoic acid.

Example 10

20 parts of aluminium ethoxide are dissolved in 10.5 parts of delta³-tetrahydrobenzyl delta³-tetrahydrobenzoate, and 200 parts of delta³-tetrahydrobenzaldehyde are added with stirring to the solution, the reaction temperature being kept at 25°–40° C. by cooling. After 2 hours the product is distilled from the catalyst, giving 205.8 parts of delta³-tetrahydrobenzyl delta³-tetrahydrobenzoate, the yield being 95.8% of the theoretical.

Example 11

28.5 parts of freshly distilled delta³-tetrahydrobenzaldehyde are added slowly to 1.5 parts of powdered aluminium isopropoxide, the temperature being kept below 40° C. by cooling. The crude ester so formed is refluxed with 50 parts of 30% potassium hydroxide until the saponification is complete. The product is extracted with ether to give 14.4 parts of tetrahydrobenzyl alcohol. The aqueous layer is acidified with concentrated hydrochloric acid, and ether extracted to give 14.7 parts of tetrahydrobenzoic acid.

Example 12

25 parts of freshly distilled delta³-tetrahydrobenzaldehyde are added to 3 parts of powdered magnesium ethoxide. The reaction mixture is not cooled and the temperature rises to 38° C. After 2 hours the percentage of aldehyde unreacted (by titration) is 19%.

The product is distilled up to give 3.8 parts of unreacted tetrahydrobenzaldehyde and 16.8 parts of tetrahydrobenzyltetrahydrobenzoate.

We claim:

1. In a process for the preparation of pimelic acid by heating delta³-tetrahydrobenzoic acid in the presence of alkali to a temperature in the range 250° to 400° C. to give a salt of pimelic acid, that improvement comprising condensing delta³-tetrahydrobenzaldehyde containing less than about 3% of acidic impurities in the presence of a compound selected from the group consisting of aluminium and magnesium alkoxides at a temperature between 0° C. and 110° C. to give delta³-tetrahydrobenzyl delta³-tetrahydrobenzoate and hydrolysing said delta³-tetrahydrobenzyl delta³-tetrahydrobenzoate to produce delta³-tetrahydrobenzoic acid and delta³-tetrahydrobenzyl alcohol.

2. A process as in claim 1, wherein the condensation of the delta³-tetrahydrobenzaldehyde is carried out in the presence of an inert organic solvent.

3. A process as in claim 1, wherein the condensation of the delta³-tetrahydrobenzaldehyde is carried out in the presence of aluminium isopropoxide.

4. A process as in claim 1 wherein said delta³-tetrahydrobenzyl delta³-tetrahydrobenzoate is hydrolyzed with aqueous potassium hydroxide.

5. A process as in claim 1 wherein said delta³-tetrahydrobenzyl delta³-tetrahydrobenzoate is hydrolyzed with aqueous sodium hydroxide.

6. A process for the preparation of delta³-tetrahydrobenzyl delta³-tetrahydrobenzoate which comprises condensing delta³-tetrahydrobenzaldehyde containing less than about 3% of acidic impurities in the presence of a compound selected from the group consisting of aluminium and magnesium alkoxides at a temperature between 0° C. and 110° C.

7. A process for the preparation of pimelic acid which comprises condensing delta³-tetrahydrobenzaldehyde in the presence of a compound selected from the group consisting of aluminium and magnesium alkoxides to give delta³-tetrahydrobenzyl delta³-tetrahydrobenzoate, hydrolysing with alkali said delta³-tetrahydrobenzyl delta³-tetrahydrobenzoate, separating the salt of delta³-tetrahydrobenzoic acid and the delta³-tetrahydrobenzyl alcohol, heating said salt of delta³-tetrahydrobenzoic acid in the presence of alkali to a temperature in the range 250° to 450° C. to give the corresponding salt of pimelic acid and oxidising said delta³-tetrahydrobenzyl alcohol to delta³-tetrahydrobenzaldehyde.

References Cited in the file of this patent

UNITED STATES PATENTS

| Number | Name | Date |
|--------|------|------|
| 2,454,047 | Finch et al. | Nov. 16, 1948 |
| 2,526,702 | Smith | Oct. 24, 1950 |
| 2,576,901 | de Jong | Nov. 27, 1951 |

OTHER REFERENCES

French et al., J. Am. Chem. Soc., vol. 64, pages 1497–9 (1940).

Adams et al. "Org. Reactions," vol. 2, pages 94–98 (1944).